Jan. 18, 1966  L. BOREL  3,229,958
HYDRAULIC TURBINE SPEED CONTROL DEVICE
Filed May 11, 1964
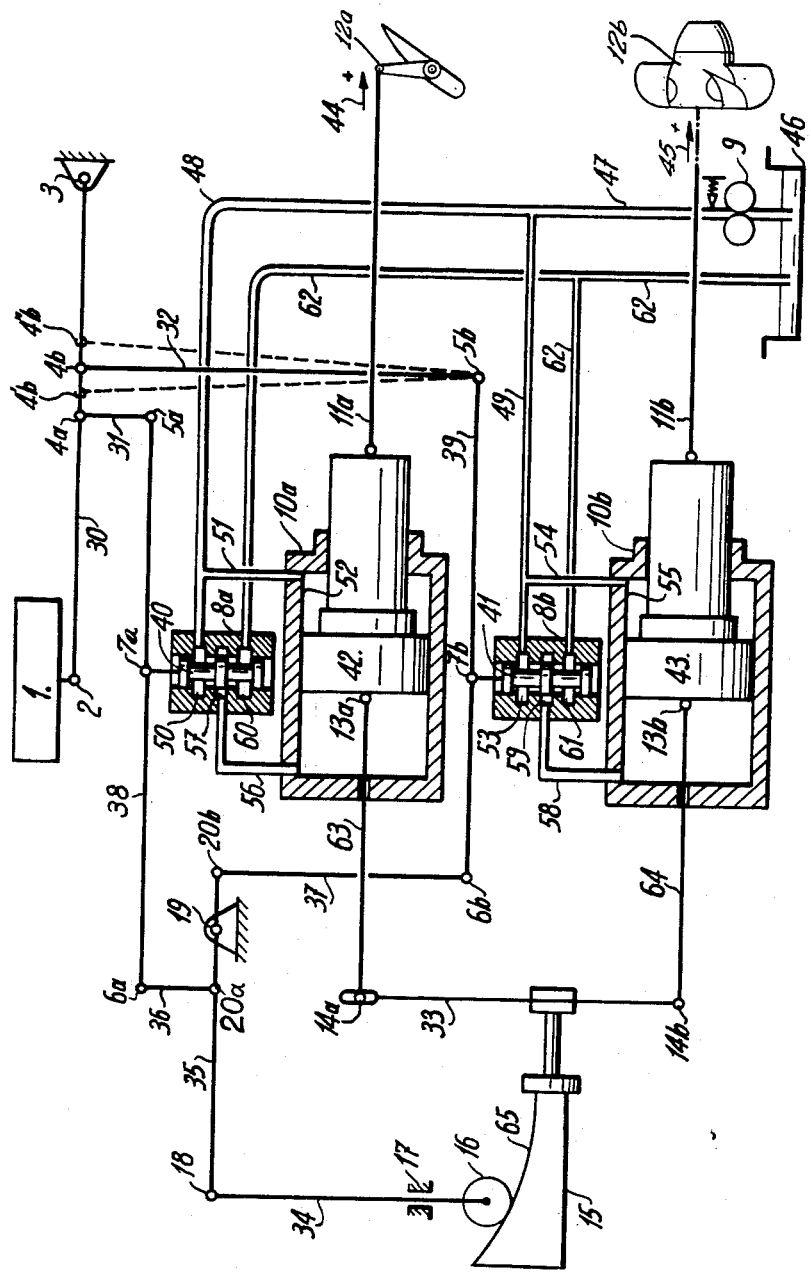
INVENTOR
LUCIEN BOREL
BY Emory L. Groff Jr.
ATTORNEY

United States Patent Office

3,229,958
Patented Jan. 18, 1966

1

3,229,958
HYDRAULIC TURBINE SPEED
CONTROL DEVICE
Lucien Borel, Lausanne, Vaud, Switzerland, assignor to
Ateliers de Constructions Mecaniques de Vevey S.A.,
Vevey, Vaud, Switzerland, a Swiss corporation
Filed May 11, 1964, Ser. No. 366,358
Claims priority, application Switzerland, May 24, 1963,
6,469/63
6 Claims. (Cl. 253—24)

This invention relates to a speed control device for an hydraulic turbine.

Hydraulic turbines used for the production of electrical energy are divided into three main types: Francis turbines, Pelton turbines and Kaplan turbines. The last two types of turbines are characterised by the feature that they have double control.

The majority of Pelton turbines comprise at least one injector which controls the supply of water and at least one deflector which can deflect this supply so that it avoids the driving wheel.

Kaplan turbines comprise a distributing member, called the gate, which is mounted between the feed tank and the driving wheel and which controls the supply passing through the turbine. The driving wheel comprises a hub having several blades which can pivot about an axis usually perpendicular to the axis of rotation, thus constituting the wheel having a variable pitch. The modifications of pitch make it possible to improve the yield of the turbine dependently on the flow which passes through it. The regulator responsible for these variations also acts simultaneously on the position of the gate distributor.

Kaplan turbines thus comprise a component which establishes a link between the positions of the distributor of the turbine and those of the wheel blades. This linking device is often obtained by means of cams which can be adapted in such manner that, when the head of water varies and irrespective of the power provided and the head of water, the yield of the turbine under stable conditions is optimum.

The speed governor of these turbines acts on the distributing slide valve which controls, by means of an initial servo-motor, the position of the gate valve. This position, through a linking device, in turn controls the distributing slide valve of a second servo-motor which controls the movement of the blades of the wheel so that, under stable conditions, with each opening of the gate valve, there is only one corresponding position of the blades of the wheel.

This method of procedure is admissible under stable conditions but the conduct of the group fitted with a regulator of this nature is unsatisfactory from the point of view of the stability of control, especially when the power supplied by the turbine is close to the maximum power. These difficulties of control are due in particular to the fact that for large openings of the gate valve, the latter must make very large movements in order to effect slight modification of the power of the machine.

To improve this situation it has been proposed to cause the distributing slide valve for the blades of the wheel to be acted in addition to the control originating from the linking device, by a control originating directly from the regulator. The machine improved in this manner behaves better than the preceding machine, but the position of the blades of the wheel has no direct action on that of the gate of the turbine, which gate controls the turbine.

2

The object of the present invention is to surmount the difficulties of control stated above.

According to the invention a speed control device for an hydraulic turbine with double control, comprises a regulating component which measures the value to be controlled and in particular the speed, at least one servo-motor for operating each of the two members of the turbine, modifying the flow of water through the latter by control of the member, at least one slide valve distributor for controlling the or each servo-motor, a linking device for establishing a correspondence between the positions of one of the control members and the positions of the other member, characterised by the feature that this linking device is controlled by the position of the two servo-motors and connected symmetrically to the two distributing slide valves in such manner as to act symmetrically on the two members controlling the flow of water, causing a closing movement of the excessively open member and an opening movement of the excessively closed member.

The single figure of the attached drawings is a diagram, given by way of example, of an embodiment of the installation of the present invention.

A speed control device for an hydraulic turbine having double control comprises a regulating component 1 for causing displacement of a point 2 depending on the control parameters which are peculiar thereto. For example, the point 2 is displaced upwardly when the speed is greater than desired. The control member 1 may comprise a speed gauge, an accelerometer, a device with permanent statism, a device with transitory statism, or any other known system and may be an electronic device.

A lever 30 pivoted at a fixed point 3, is pivoted at its other end to the point 2. This lever transmits the movements of the point 2 to other transmission members indicated hereinafter:

First, an arm 31, pivoted at 4a on the lever 30 and at 5a on a swing bar 38; then an arm 32, linked at one of its ends at 4b on the lever 30 and at its other end 5b on a swing bar 39. The swing bar 38 is pivoted at 7a on the slide valve 40 of a distributor 8a controlling a servo-motor 10a. The swing bar 39 is pivoted at 7b on the slide valve 41 of a distributor 8b controlling a servo-motor 10b. The servo-motor 10a has a differential piston 42 connected by a rod 11a to the distributor gate 12a of the turbine.

The servo-motor 10b comprises a differential piston 43 connected by a rod 11b to the control member for directing the blades of a Kaplan turbine wheel 12b. The direction of opening the distributor gate 12a is indicated by the arrow 44, where as the direction of opening the blades of the turbine wheel 12b is indicated by the arrow 45.

The oil of the servo-motor 10a and 10b is fed under pressure from a tank 46 from which the oil is pumped by a pump 9 which forces it into a duct 47 continuing by two branches 48 and 49. The branch 48 terminates, on the one hand in a chamber 50 of the distributor 8a and, on the other hand, in a branch 51 in a cylinder 52 of the servo-motor 10a adjacent to the small section of the piston 42. The duct 49 terminates in a chamber 53 of the distributor 8b and, in a branch 54, in the cylinder 55 of the servo-motor 10b adjacent to the end of small cross-section of the piston 43. The other end of the cylinder 52 is connected by duct 56 to a small chamber 57 of the distributor 8a. Likewise, the left side of the cylinder 55 is connected by a conduit 58 to a middle chamber 59 of the distributor 8b.

The distributors 8a and 8b each comprise third chambers 60 and 61 respectively communicating with an exhaust pipe 62 ending in the tank 46.

The differential piston 42 of the servo-motor 10a is connected to a rod 63 starting from the point 13a, corresponding to the end of the piston 42 of large cross-section, to a buttonhole or slot connection 14a. Likewise, the piston 43 is connected, by a rod 64 at the corresponding point 13b on its large end, to the point 14b. The link between these points 14a and 14b is obtained by a bar 33.

The linking device, with which this control system is produced, comprises a cam 15 rigidly connected to the bar 33. The profile 65 of this cam 15 has a shape which precisely complies with the law of the linking or yoking of the positions of the servo-motors 10a and 10b respectively, controlling the gate 12a of the turbine and the direction of the blades of its wheel 12b. This linking device also comprises a connecting rod 34 sliding in a guide 17. The connecting rod 34 carries at one of its ends a roller 16 forming a follower of the profile 65 of the cam 15. The other end of the connecting rod 34 is pivoted at 18 to a lever 35 swinging about a fixed point 19. This lever 35 is connected to the swing bar 38 by an articulated arm 36, at 20a on the lever 35 and at 6a on the swing bar 38. The end 20b of the lever 35 is linked to an arm 37, pivoted at 6b to one end of the swing bar 39.

It will be seen from the above description that the vertical movements of the roller 16 are transmitted by means of the connecting rod 34 to the lever 35 which itself transmits oscillating movements on the one hand to the slide valve 40 of the distributor 8a and on the other hand to the slide valve 41 of the distributor 8b.

In describing the operation of the device, it should be borne in mind that the distributors 8a, 8b respectively control servo-motors 10a and 10b. Since the two assemblies: distributor 8a and servo-motor 10a, distributor 8b and servo-motor 10b, are similar, it will suffice to explain the operation of one of these assemblies.

When the centre piston of the slide valve 40 of the distributor 8a occupies a position in the middle of its path of travel, that is to say, in its position of equilibrium, the feed which arise from the pump 9 is zero, for the oil cannot flow out of the chamber 50. Although the oil pressure acts on the small end of the piston 42 through the branch 51, this piston 42 cannot be displaced due to the fact that the volume of oil in the left portion of the cylinder 52 is kept constant by the closing of the duct 56 by the centre piston of the slide valve 40. If, on the other hand, the slide valve 40 is displaced upwardly, it will be seen that the distribution of oil is effected in such manner that the left portion of the servo-motor 10a is connected with the exhaust pipe 62 by means of the duct 56 and the chamber 60, whereas the right portion of the cylinder 52 still communicates with the pump 9, causing a movement from right to left of the piston 42 of the servo-motor 10a, that is to say, a movement closing the gate 12a. The reverse takes place for a descending movement of the slide valve 40 of the distributor 8a, said descending movement causing an opening movement of the gate 12a.

Assuming that the lever 30 occupies a fixed position in space and that the blades of the turbine wheel 12b are too far open relatively to the position of the gate 12a, this excess opening is accompanied by the pivoting point 14b being too much to the right relatively to the diagram, the points 16 and 18 being too low and the points 20a, 6a and 7a also being too low, thus involving a movement from left to right of the piston 42 of the servo-motor 10a. This movement corresponds to an opening movement of the gate 12a. The points 20b, 6b and 7b however, are too high, which invlves a movement of the piston 43 of the servo-motor 10b from right to left, that is to say, a closing movement of the blades of the wheel 12b. The two movements tend to compensate the cause which has produced them. They stop when the roller 16 occupies the original position of equilibrium.

It will therefore be seen that the linking or yoking device acts simultaneously on the two servo-motors constituting the double control by opening the member which is excessively closed and closing the member which is excessively open relatively to the link.

The device described could be employed with a Pelton turbine. In that case it would be necessary to replace the gates of the turbine by a deflector, and the blades of the wheel by a needle valve, or conversely.

To further improve the regulating features, it is desirable to be able to proportion the relative influences of the different movement.

If, for example, the point 4b is shifted to 4′b or 4″b, the effect of this displacement is to increase or diminish the influence derived from the control element 1 on the slide valve of the distributor 8b. For this reason adjusting means is provided for displacing the points 4a, 20a and 20b, thus making it possible to adjust individually the effects of the control element 1 and of the linking or subjecting mechanism on the servo-motors 10a, 10b described as connected to the gate valve and the wheel.

The embodiment illustrated in the diagram requires mechanical components such as bearings, levers, connecting rods and the like. It will be appreciated that the same object may be achieved by replacing these mechanical components by electric components, for example potentiometers, variometers, selsyns which make it possible to convey a movement from one place to another; similarly an embodiment using a hydraulic transmission is also possible.

I claim:
1. A speed control device for a hydraulic turbine having two control members for dual regulation of the flow of fluid therethrough, comprising:
  a velocity regulating member for measuring the speed of the turbine;
  a first servo-motor operatively connected to the first of said two control members;
  a second servo-motor operatively connected to the second of said two control members;
  a first distributor and a second distributor each operatively connected to said velocity regulating member;
  a first slide valve in said first distributor operatively connected to said first servo-motor;
  a second slide valve in said second distributor operatively connected to said second servo-motor;
  and linking means connected between said two control members, said linking means including a single cam operatively connected to both of said servo-motors and whose position depends on the position of said two servo-motors, a cam follower in contact with and following the profile of said cam and transmission elements connecting said cam follower to said first slide valve and said second slide valve, and to said velocity regulating member so that when one slide valve is displaced in one sense the other slide valve is displaced in the opposite sense whereby said cam and follower cause a closing movement of one control and an opening movement of the other control and the linking means transmits a movement to the two slide valves to cause said servo-motors to act in the desired direction on the control members to regulate the flow of fluid through the turbine.

2. A speed control device according to claim 1, wherein said movement is transmitted simultaneously and permanently to the two slide valves of the distributors to act symmetrically on the two control members regulating the flow of said fluid.

3. A speed control device according to claim 1, wherein the velocity of fluid measured by the regulating member is transmitted simultaneously and permanently to the two slide valves of the distributors to act in the desired direction on the elements regulating the flow of said fluid.

4. A speed control device according to claim 1, wherein said movement and the velocity of fluid to be measured are transmitted simultaneously and permanently to the two slide valves of the distributors to act on the control members regulating the flow of said fluid.

5. A speed control device according to claim 1, wherein the transmitted movement between the linking means and at least one of the slide valves is adjustable, so that the influence of the conjugation device on the said slide valve is adjustable.

6. A speed control device according to claim 1, wherein the transmitted movement between the regulating member, and at least one of the slide valves of the servo-motor is adjustable, so that the influence of the regulating member on at least one of the distributors of the servo-motor is adjustable.

References Cited by the Examiner
FOREIGN PATENTS 1,155,900 12/1957 France.
28,246 10/1957 Norway.
29,230 11/1918 Norway.

MARK NEWMAN, *Primary Examiner.*

JULIUS E. WEST, *Examiner.*

W. E. BURNS, *Assistant Examiner.*